United States Patent [19]

Herbert

[11] Patent Number: 6,151,641
[45] Date of Patent: Nov. 21, 2000

[54] DMA CONTROLLER OF A RAID STORAGE CONTROLLER WITH INTEGRATED XOR PARITY COMPUTATION CAPABILITY ADAPTED TO COMPUTE PARITY IN PARALLEL WITH THE TRANSFER OF DATA SEGMENTS

[75] Inventor: Brian K. Herbert, Colorado Springs, Colo.

[73] Assignee: LSI Logic Corporation, Milpitas, Calif.

[21] Appl. No.: 08/941,620

[22] Filed: Sep. 30, 1997

[51] Int. Cl.[7] ....................................................... G06F 13/14
[52] U.S. Cl. ................................... 710/22; 714/1; 714/5; 714/6; 714/801
[58] Field of Search ................................. 371/37.1, 51.1; 395/575, 182.03, 182.04; 714/801, 6, 5; 710/1, 22

[56] References Cited

U.S. PATENT DOCUMENTS

| | | | |
|---|---|---|---|
| 4,052,699 | 10/1977 | Micka et al. | 362/297 |
| 4,996,690 | 2/1991 | George et al. | 371/37.1 |
| 5,191,584 | 3/1993 | Anderson | 371/51.1 |
| 5,206,943 | 4/1993 | Callison et al. | 711/114 |
| 5,257,391 | 10/1993 | DuLac et al. | 395/800 |
| 5,373,512 | 12/1994 | Brady | 371/40.1 |
| 5,390,327 | 2/1995 | Lubbers et al. | 395/575 |
| 5,471,640 | 11/1995 | McBride | 395/842 |
| 5,594,862 | 1/1997 | Winkler et al. | 395/182.03 |
| 5,742,752 | 4/1998 | DeKoning | 395/182.04 |
| 5,787,463 | 7/1998 | Gajjar | 711/114 |
| 5,798,750 | 8/1998 | Ozaki | 345/126 |
| 5,838,892 | 11/1998 | Wilson | 714/799 |

FOREIGN PATENT DOCUMENTS

| | | | |
|---|---|---|---|
| 0482818 | 10/1991 | European Pat. Off. | G06F 11/10 |
| 0488782 | 11/1991 | European Pat. Off. | G06F 11/20 |

*Primary Examiner*—Thomas C. Lee
*Assistant Examiner*—Abdelmoniem Elamin

[57] ABSTRACT

A DMA controller including an XOR FIFO buffer and XOR circuitry for computation of parity. The DMA controller resides within a RAID controller and establishes a direct data connection from host memory to subsystem local memory in order allow the CPU to perform other functions. The DMA controller accesses data segments from host memory corresponding to blocks of data within a disk stripe. As the data is transferred from host memory to subsystem local memory, the XOR circuitry simultaneously computes the parity corresponding to the successive data segments. Computing parity substantially simultaneously with the DMA data transfer reduces memory bandwidth utilization on the memory bus of the RAID controller. The parity is stored in the XOR buffer. Once parity is computed for a portion of data segments corresponding to a data stripe, the parity is transferred to local memory for retention. These steps are repeated until the full stripe is read into local memory and a parity value is computed for the entire data stripe. Once the RAID controller is ready to post the data to disk, the data is transferred from local memory to disk. The DMA controller of the present invention may also be advantageously applied when performing partial stripe writes by reducing the memory bandwidth utilization required to compute partial parity values.

16 Claims, 3 Drawing Sheets

DMA CONTROLLER OF A RAID STORAGE CONTROLLER WITH INTEGRATED XOR PARITY COMPUTATION CAPABILITY ADAPTED TO COMPUTE PARITY IN PARALLEL WITH THE TRANSFER OF DATA SEGMENTS

BACKGROUND OF THE INVENTION

1. Field of the Invention

This invention relates to data storage subsystems, and more particularly, to a DMA controller with integrated XOR parity computation capability adapted to compute parity in parallel with the transfer of data segments.

2. Discussion of Related Art

Redundant Arrays of Inexpensive Disks (RAID) systems are disk array storage systems designed to provide large amounts of data storage capacity, data redundancy for reliability, and fast access to stored data. RAID provides data redundancy to recover data from a failed disk drive and thereby improve reliability of the array. Although the disk array includes a plurality of disks, to the user the disk array is mapped by RAID management techniques within the storage subsystem to appear as one large, fast, reliable disk.

There are several different methods to implement RAID. RAID level 1 mirrors the stored data on two or more disks to assure reliable recovery of the data. Other common implementations of RAID, levels 3, 4, and 5 distribute data across the disks in the array and provide for a block (or multiple blocks) of redundancy information (e.g., parity) that is also distributed over the disk drives. On each disk, data is mapped and stored in predefined blocks generally having fixed size. A predefined number of blocks of data and redundancy information (e.g., parity), from each disk of the array, are mapped to define a stripe of data. One common type of stripe, the parallel stripe, provides load balancing across the disks in the array by defining the stripe as parallel blocks of data across the disk array.

In RAID level 3, and 4, the redundant information, that is parity information, is stored in a dedicated parity disk. In a RAID level 5 implementation, the parity information is interleaved across all the disks in the array as a part of the stripe.

RAID levels 3, 4, and 5 suffer I/O performance degradation due to the number of additional read and write operations required in data redundancy algorithms. RAID controllers often include local memory subsystems (e.g. cache) used to temporarily store data and parity involved in a host I/O operation and thereby mitigate the performance degradation of the redundancy techniques.

There are two common write methods implemented to write new data and associated new parity to the disk array. The two methods are the Full Stripe Write method and the Read-Modify-Write method also known as a partial stripe write method. If a write request indicates that only a portion of the data blocks in any stripe are to be updated then the Read-Modify-Write method is generally used to write the new data and to update the parity block of the associated stripe. The Read-Modify-Write method involves the steps of: 1) reading into local memory old data from the stripe corresponding to the blocks to be updated by operation of the write request, 2) reading into local memory the old parity data for the stripe, 3) performing an appropriate redundancy computation (e.g., a bit-wise Exclusive-Or (XOR) operation to generate parity) using the old data, old parity data, and the new data, to generate a new parity data block, and 4) writing the new data and the new parity data block to the proper data locations in the stripe.

If all the blocks in a stripe are available in the local memory or provided in the write request, then a Full Stripe Write is possible. In a Full Stripe Write, the parity computation is a XOR of all the data blocks within a stripe. The Full Stripe Write avoids the need to use old parity data during the new parity computation. Full Stripe Write improves I/O performance because a memory access is not required to read the old parity data from disk and to place a copy of the old parity in local memory.

It is known to use a DMA circuit in a RAID controller to transfer data from a source to a destination. Exemplary of such a DMA transfer is the exchange of data between a host system memory and the RAID controller local memory (e.g., cache or other buffers). A request is made to the DMA circuit to perform a data transfer. The DMA controller establishes a direct data path between the host RAM and the local memory (e.g., cache). Thus, the DMA allows the RAID controller central processing unit (CPU) to perform other tasks while the data exchange occurs in parallel. In the case of a write operation from the host to the RAID subsystem, the RAID controller CPU reads the data from local memory and computes required parity as noted above. The disk drive controller is programmed to transfer the data and new parity from the RAID subsystem local memory to the disk array.

The local memory is therefore accessed a number of times for each such complete write operation. First, the local memory is written with the data transferred from the host. Second, the same data is read again to compute the parity data, and finally the data is read again to write the data and associated parity to the disk array. Each of these local memory accesses utilizes valuable memory bandwidth in the RAID controller. It is desirable to reduce the utilization of the local memory bandwidth utilized for each write operation so as to improve the overall I/O performance of the RAID subsystem.

Some prior techniques and devices have integrated parity computation circuits with the DMA controller to simplify or speed the computation of XOR parity data. Such known techniques tend to integrate the XOR computation with the DMA controller such that the computations is performed at the "back-end" of the RAID controller data transfers. In other words, the DMA controller performs the XOR parity computation as the data is transferred from the RAID controller local memory to the disk array. In such methods, the DMA controller reads the stripes of data to be written from RAID subsystem local memory and simultaneously computes the parity of the stripe as it transfers data to the disk array.

Back-end parity computations generally require that the disk drives be operable in a synchronized manner such that the parity computation and DMA transfer operate in "lockstep" among a plurality of disk drive transfer operations. Parity is computed using related portions (segments) of the stripe. The XOR computation circuits must therefore receive the proper sequence of related bytes in related segments to compute a correct XOR parity segment for the related segments.

Such "lock-step" operation is used in older technology disk drives such as integrated drive electronics (IDE) interface devices because the RAID controller is more directly controlling the data transfer. IDE drives run single threaded in that each data transfer requires a handshake. Each transfer of data (e.g., byte or 16-bit word) requires a request to the RAID controller and acknowledgment of the data delivery by the disk drive controller before the next unit of data is transferred.

To accommodate this precision timed lock-step approach, a high speed static RAM (SRAM) buffer is commonly used in conjunction with the DMA transfer to assure readiness of the data when the DMA is requested to transfer the next unit of data to the disk drives. Not only is such an additional SRAM buffer somewhat costly, but it requires that the local memory data be read once again to transfer the data block from the lower speed local memory to the high speed SRAM transfer buffer.

Such back-end DMA/parity computations are not well suited to today's RAID systems that utilize disk drive devices having substantial buffering and intelligence within the drive device, for example a SCSI disk drive. The use of the SCSI drive device allows the SCSI controller to control the data transfer. The SCSI controller takes control of the bus and issues commands to transfer data from local memory (e.g. cache), rather than the CPU utilizing the DMA to transfer data to the disk drive. Higher performance SCSI disk drives typically contain significant buffering and computational intelligence to optimally order a plurality of commands queued within the drive itself (in a buffer local to the drive). For example, some SCSI disk drives have the computational intelligence for command queuing and elevator sorting. Such optimizations are often key to achieving the specified performance levels of the disk drives. SCSI controllers optimize performance by sorting I/O requests before saving data or before retrieving data. Therefore, the order the I/O request was received does not matter because the SCSI controller will sort the I/O request to optimize data retrieval and data storage to disk.

These optimization features are defeated by these lockstep sequences as required by the known back-end DMA/Parity techniques. In these cases, the substantial buffering within the drive device is not effectively utilized because the parity computation may be corrupted if the related segments are not transferred in the proper sequence. For example, one of the plurality of SCSI disk drives relating to a particular stripe may determine for any of several reasons that the buffer cannot handle further data at this time or a SCSI drive may chose to resequence operations in its buffer to optimize drive operations. Such a determination by one drive may require logic to stop the DMA/Parity operations to all drives so as to assure proper sequencing of the stripe data through the XOR circuits. Such additional logic to assure lock-step sequencing of all drives in a stripe serves to defeat the intelligence and buffering of high speed drives thereby negatively impacting overall subsystem performance.

It is evident from the above discussion that a need exists for enhanced DMA/Parity circuits which overlap parity computation with data transfer while reducing bandwidth requirements for local memory without substantially increasing hardware costs.

SUMMARY OF THE INVENTION

The present invention solves the above and other problems, thereby advancing the useful arts, by providing a DMA controller in a RAID controller which performs XOR parity computation substantially in parallel (simultaneous) with the transfer of data at the "front-end" of the data exchange operations. By performing the parity computation in parallel with the front-end data transfer (from the host to the RAID controller local memory), the need for lock-step synchronization with the disk drives is obviated.

The present invention transfers a segmented block of data in a predetermined order from the source memory in order to perform the early parity computation. The process of segmenting source data, as defined by a scatter/gather list, is applicable in a contiguous or non-contiguous memory. A gather list is a data structure linking blocks of data in a predetermined order for the purpose of transferring the blocks of data from particular source addresses which may or may not be contiguous. A scatter list is a data structure linking blocks of data in a predetermined order for the purpose of transferring the blocks of data to particular destination addresses which may or may not be contiguous.

For example, to transfer the data segments in a predetermined order from host memory to the local memory, the gather list stored within the disk array controller contains, in a specific order, a list of host addresses translated to a series of internal bus addresses. The scatter list stored within the disk array controller determines the destination address of the data segments in local memory.

As the data segments are transferred, in the sequence defined by the scatter/gather lists, circuits in the DMA controller of the present invention monitor (or "snoop") the disk controller internal bus to capture the data as it is transferred. The captured data is then used in XOR parity computations as described herein. Address ranges defined in the controller are used to determine whether addresses on the disk controller internal bus correspond to a valid data segment of the stripe. The circuitry performing the XOR parity computation uses the programmed address ranges to determine the data to "snoop" or read as it is transferred to local memory. The XOR parity circuitry computes the parity of the "snooped" data segments as they are transferred to the destination.

In particular, the present invention is applicable to RAID controllers that attach directly to the host system's main bus (e.g., a PCI bus). The DMA controller of the RAID controller therefore completely controls the sequence of transfers directly from the host system's main memory on the PCI bus to the RAID controller local memory. Specifically, the DMA controller of the present invention enables the RAID subsystem controller to read data from the host at the subsystem's direction.

The present invention allows the RAID subsystem to control the ordering and the size of the DMA data transfer. Previously, the host directed the transfer of a contiguous block of data to the subsystem local memory, such as cache, and the RAID subsystem later performed the parity generation. The present invention allows the RAID subsystem to direct the transfer of a segmented block of data and perform an early parity computation, as the data is stored in subsystem local memory, thus allowing the subsystem to eliminate one read operation to local memory.

The present invention is best suited to, though not exclusively suited to, RAID controllers that make use of the Full Stripe Write method. The early parity computations reduce the number of read operations from local memory or disk array because all the data in the stripe is used to compute parity as it is transferred from the host system. The parity computation for the full stripe is therefore completed in parallel with the transfer of the stripe from the host memory to the RAID local memory. Therefore, the RAID subsystem does not need to access any further data from disk or local memory to compute parity. After computing the parity corresponding to a portion of a data stripe, the resultant parity data within the DMA circuit of the present invention is stored in local memory until the RAID controller is ready to post the computed parity data to disk.

The present invention interfaces with the host's PCI bus using a PCI bus bridge as the front-end interface. A person skilled in the art will recognize that the present invention may be applied to many commercially known bus structures. The PCI bus is but one example of a presently available, commercially popular bus for peripheral device interconnection in host systems as well as for busses within intelligent peripheral devices such as a RAID controller.

The exemplary use of the present invention, as presented herein, is in a RAID 5 disk array subsystem. A person skilled in the art will recognize the present invention is operable in other types of RAID disk array arrangements.

As used herein, a stripe is comprised of a plurality of blocks, one on each of a plurality data disks and one on a parity disk. The block on the parity disk is computed as the bitwise Exclusive-OR (XOR) of the corresponding blocks on the data disks of the stripe. Specifically, the XOR of each first bit of each block on each data disk generates the first bit of the parity block. The XOR of the second bit of each data block generates the second bit of the parity block, etc. Naturally, the computations are performed in more convenient units such as 8, 16, or 32 bit words.

As stored in host memory, the data blocks of the stripe are generally sequential in contiguous memory. Prior techniques have generally transferred data from such a host memory to local memory in the same sequential order. The present invention, by contrast, transfers such data in a specific non-sequential manner to perform XOR parity computations in parallel with the DMA transfer while minimizing the intermediate buffer space required to do so.

In accordance with the present invention, the RAID controller uses a DMA controller coupled to an XOR buffer. The XOR buffer comprises logic circuits for capturing the data as the DMA controller transfers from the host memory to the local memory and computing XOR parity therefrom and further comprises a FIFO buffer for accumulating, that is, storing the XOR computation intermediate results. As the DMA controller transfers a plurality of data segments from host RAM to local memory, such as cache or nonvolatile memory, the XOR buffer substantially simultaneously computes the parity of the data segment and stores the XOR parity result in the FIFO of the XOR buffer. The FIFO of the XOR buffer of the present invention preferably stores 512 bytes preferably arranged as 128 32-bit wide entries.

More specifically, in response to a write request for a stripe, the DMA transfers the first data segment of the first block of the stripe from the host system memory to local memory. As this first data segment is written to local memory, the XOR buffer "snoops," that is the XOR buffer reads the first data segment from the RAID subsystem internal bus as the DMA transfers the data. The snooped data is stored in the FIFO of the XOR buffer as it is snooped from the internal bus. A second data segment corresponding to the first segment of the second block of data from the data stripe is then transferred by the DMA from the host system memory to local memory. The XOR buffer snoops the second data segment from the RAID subsystem internal bus as the second data segment is copied into local memory. The first data segment (stored in the FIFO of the XOR buffer) and the second data segment are XOR'd as the DMA transfers the data to obtain an intermediate parity result. A third data segment corresponding to the first segment of the third block of data from the data stripe is transferred from host memory to local memory. The XOR buffer snoops the third data segment from the RAID subsystem internal bus and performs the XOR of the previous intermediate parity result and the third data segment which results in an updated intermediate parity. This process continues for all first segments of remaining blocks of the stripe until a final parity segment is generated. This final parity computation represents the parity segment of the first segments of all blocks of the data stripe. The DMA transfers this parity segment final result to local memory for further processing.

The present invention repeats this process for the second segments of all blocks, the third segments, etc. until all data segments within host memory corresponding to a stripe are transferred to local memory and the parity is computed for the corresponding data segments. The final parity segment result for each segment of the stripe is transferred to local memory. The XOR buffer is reinitialized when computing parity for a new set of segments. Later when the RAID controller is ready to post the data to disk, the disk controller is configured to retrieve data from the local memory along with corresponding parity already computed and stored in local memory and write it to disk.

Though the present invention is best suited to such full stripe write operations, it may also be applied to partial strip write operations. If all the data blocks corresponding to the disk stripe are not present in the source, a Read-Modify-Write operation is often used by the RAID controller in response to a write request. The present invention, though best suited to full-strip-writes, is none the less operable to reduce the number of read operations required. When a partial write operation is executed, the RAID subsystem transfers data or parity (depending on the RAID level and the number of blocks not present in host memory) from disk to the local memory. An XOR buffer coupled to the DMA controller is loaded with data from local memory which is then XOR'd with the new data transferred via the DMA controller from the host memory.

In the case of a single block being updated, the RAID controller may be configured to transfer the old data and old parity for that block from disk to local memory. The XOR buffer coupled to the DMA controller computes the XOR of the old data and old parity. This intermediate parity is loaded segment by segment into the XOR buffer as each segment of new data is transferred from the host system. After each segment is transferred, the XOR buffer contents, which contain the new parity, are stored in local memory. In this manner, the invention reduces required bandwidth of the local memory since new data is not retrieved from local memory to compute parity.

The present invention is also useful when the RAID disk array is in degraded mode to reconstruct the lost data from the failed disk. The DMA controller reads data segments, from local memory or the disk array, corresponding to the appropriate stripe the lost data was located on. The XOR buffer stores the first data segment transferred and XOR's subsequent transfers with the previous buffer content. After all the appropriate data segments are transferred to the host, parity information is transferred to the XOR buffer. The XOR buffer computes the XOR of the buffer contents and the parity. The result is the reconstructed data and the DMA controller transfers the reconstructed data to the host system.

The present invention permits use of high performance SCSI busses to connect the RAID subsystem controller and the disk array. SCSI busses allow the disk array subsystem, e.g., the disk drives, to control the ordering as the data is transferred to the disk array. The SCSI protocol allows the SCSI peripheral device to determine when data is transferred. In response to drive requests, the DMA in the SCSI controller takes control of the internal bus in the RAID controller and accesses local memory within the RAID controller. Since the exact time when data is transferred is not known by the interface controller, SCSI interfaces are best suited to block transfers and data buffering at both the peripheral and controller.

The present invention may be used with any disk interface because the parity computation is performed in parallel with the data transfer at the front-end (host to local memory) rather than the back-end (local memory to disk). The present invention enables the use of more intelligent interfaces though it can function with low-end IDE interfaces. A person skilled in the art will recognize the present invention is operable for drives connected using an EIDE bus, Fibre Channel SCSI, Fast SCSI, or Wide SCSI or other well known interface media and protocols which provide for intelligent control by the peripheral devices attached to the RAID controller.

It is therefore an object of the present invention to provide a DMA controller for transferring a plurality of data segments from a source memory to a destination memory and computing the parity of the plurality of data segments in parallel with the transfer.

It is another object of the present invention to provide a DMA controller with XOR capability for reducing local memory accesses and thereby improving I/O performance by computing parity in parallel with the transfer of data from a source to a destination.

It is yet another object of the present invention to provide a DMA controller for reconstructing data while the storage subsystem is in degraded mode by computing parity in parallel with the transfer of data and parity from a source to a destination.

It is a further object of the present invention to provide a DMA controller for reducing storage subsystem costs by eliminating the need for lock-step transfer of data while computing parity in parallel with the transfer of data from a source to a destination.

The above and other objects, aspects, features, and advantages of the present invention will become apparent from the following description and the attached drawings.

DETAILED DESCRIPTION OF THE PREFERRED EMBODIMENTS

Figure 1:
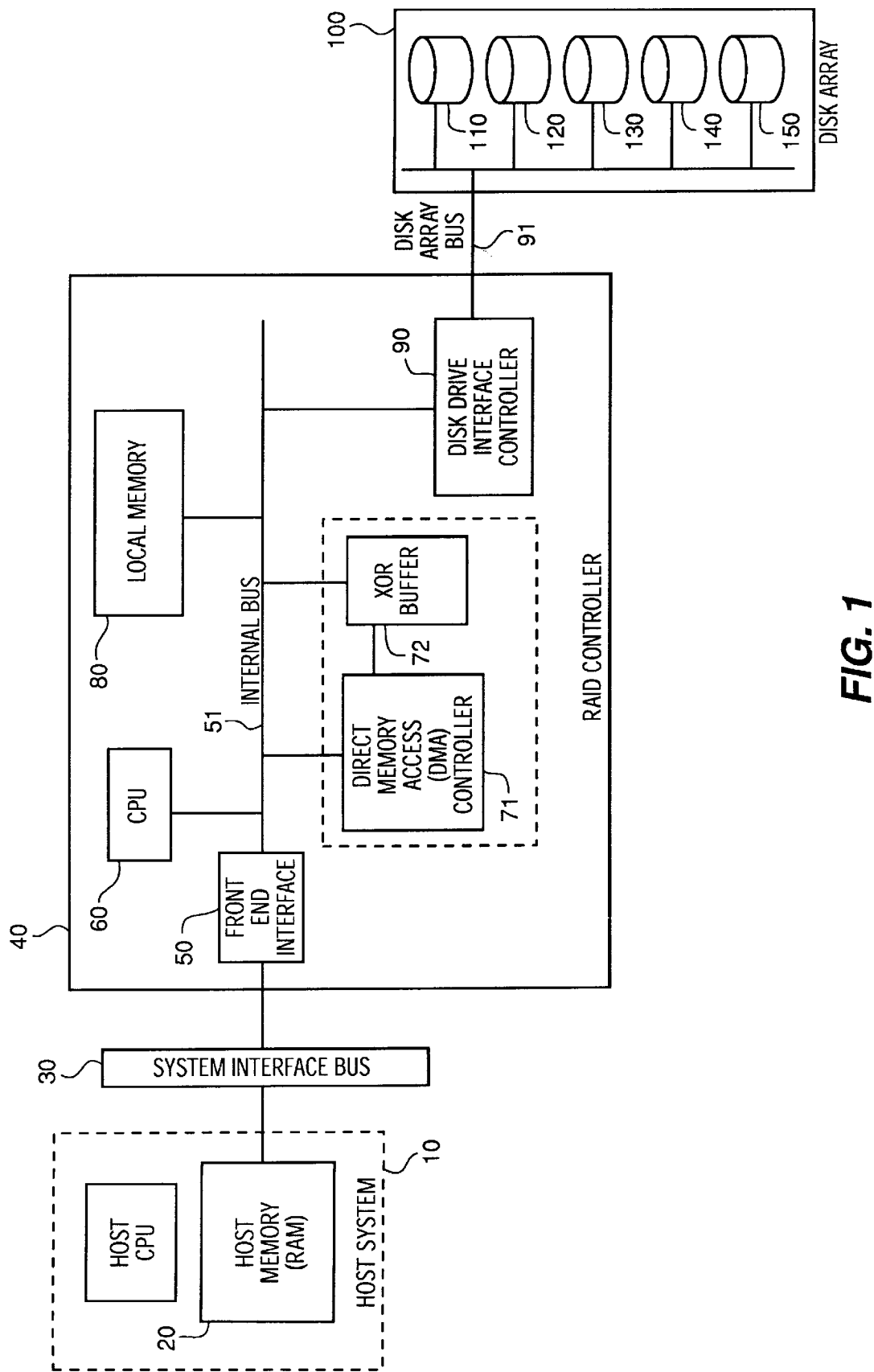
FIG. 1 is a block diagram of the RAID subsystem in which the DMA controller of the present invention is advantageously applicable.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of the RAID subsystem in which the DMA controller of the present invention is advantageously applicable. The host 10 comprising a CPU and host memory 20 is connected via the system interface bus 30. A PCI bus is commonly used as the host system interface 30 bus due to faster transfer rates as distinguished from older backplane busses such as ISA or EISA. The host system interface bus 30 can be selected based on system performance requirements. The RAID subsystem comprises the RAID controller 40 and the disk array 100.

The front-end interface 50 is a PCI Bus bridge. The PCI Bus Bridge interfaces the host's PCI bus 30 to the RAID controller's internal bus 51. The RAID controller's internal bus 51 is designed to support high data transfer rates. A person skilled in the art will recognize that the RAID controller of the present invention is also operable under other bus architectures such as ISA, EISA, Microchannel, or PCI.

The RAID controller also includes CPU 60, local memory 80, a DMA controller 71, and a disk drive interface controller 90. The local memory 80 (also referred to herein as cache or cache memory) is preferably implemented using low cost dynamic RAM (DRAM) chips. Since the techniques of the present invention do not require lockstep timing as do prior back-end DMA/Parity techniques, lower cost, lower performance DRAMS may be used for local memory 80. The DMA controller 71 includes an XOR buffer 72 to compute parity.

Figure 2:
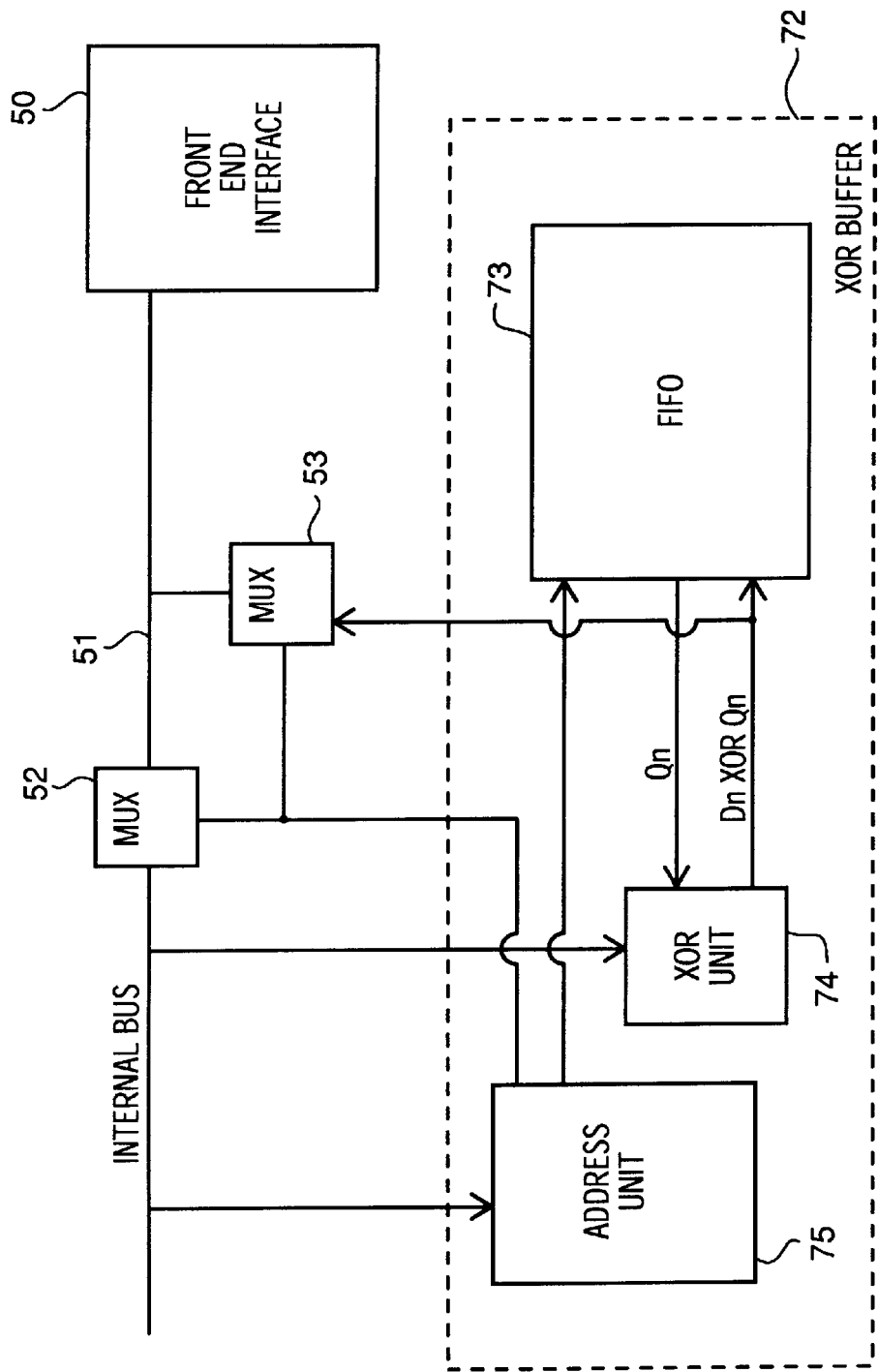
FIG. 2 is a block diagram showing the circuitry within the XOR buffer used to read, store, and compute parity as data segments are transferred from a source to a destination.

FIG. 2 depicts how the DMA controller 71 in conjunction with the XOR buffer 72 accesses and computes the parity of data segments as they are transferred from the host memory system to local memory 80. The XOR buffer 72 contains a dual ported 512 byte FIFO 73, address unit 75, and XOR unit 74.

Address unit 75 contains three sets of address registers that store the address corresponding to the destination for the data, or an internal address later translated to the destination address. The first set of address registers define an address range that is used to select data segments on internal bus 51 based on whether the data segment's address fell within the address range. When a data segment is selected, the 9 least significant bits of the address are used to select a FIFO location, data at this FIFO location is XOR'd with the data on the internal bus 51, and is written back to the FIFO at the same location. A second set of address registers define an address range so that when an address on the internal bus 51 falls within the specified range, the XOR buffer reads the data from the internal bus. A third set of address registers define a third range so that when an address on the internal bus 51 falls within the specified range, data from the internal bus is XOR'd with the corresponding location of the FIFO buffer 73 and the result is output onto the internal bus 51 via multiplexor 53. Multiplexor 52 blocks the transfer of data from the internal bus to the front-end interface 50. A control input allows the FIFO 70 to be reset to zero.

Thus, the XOR buffer in response to the programmed address ranges is enabled to perform one of four functions as data is transferred on the internal bus. First, the XOR buffer can do nothing if the address of the data segment is outside of the programmed address ranges. Second, the XOR buffer can store the data to the corresponding buffer location by using the 9 least significant bits of the address to select a FIFO location. Third, the XOR circuitry will perform the XOR of the buffer contents and data, and write back the results to the same buffer location. Fourth, the XOR buffer will output the results. A person skilled in the art will recognize the XOR buffer functions can be selectively enabled or disabled by the DMA controller 71 and CPU 60.

As DMA controller 71 transfers data from the host 10 to the local memory 80, it is also transferred to the XOR buffer 72. During the DMA transfer, a series of host address may be translated to a series of internal bus addresses. The XOR buffer 72 uses address ranges to determine whether addresses on the internal bus 51 correspond to a valid data segment of the stripe. Thus, the XOR buffer 72 uses the programmed address ranges to determine the data to "snoop" or read as it is transferred to local memory 80. For example, the range of addresses can be the size of a single segment and be updated after each segment is transferred. The XOR buffer 72 has a data capacity smaller than the size of a disk stripe. In the preferred embodiment, the storage capacity of the XOR buffer 72 is 512 bytes. A person skilled in the art will recognize the RAID controller of the present invention is operable even if the data capacity of the XOR buffer 72 is decreased or increased.

The following example shows how the present invention reads data from the internal bus and computes the parity of portions of a stripe. In response to a write request, the XOR buffer 72 is reset to all zeros. The address range of the data is written within the address unit 75. The addresses correspond to the local memory system address (which is the destination for the data), or an internal address which is later translated to the local memory address). The DMA controller 71 transfers a first data segment corresponding to a block of data from the first data stripe from the host system memory 20 to local memory 80. As the first data segment is written to local memory 80, the XOR buffer 72 "snoops," that is the XOR buffer 72 reads and stores the data segment from the RAID subsystem internal bus 51. The XOR buffer 72 "snoops" the first segment because the data address of the first data segment is within the range of addresses the XOR buffer 70 is programmed to read.

A second data segment corresponding to a second block of data from the first data stripe is transferred from the host system memory 20 to local memory 80. As the XOR buffer 72 "snoops" the second data segment from the RAID subsystem internal bus, the first data segment and the second data segment are substantially simultaneously XOR'd to obtain an intermediate parity result as the data segments are transferred to local memory. A third data segment corresponding to a third block of data from the first data stripe is transferred from host system memory 20 to local memory 80. Similarly, the XOR buffer "snoops" the third data segment from the RAID subsystem internal bus 51 and substantially simultaneously performs the XOR of the intermediate parity result and the third data segment which results in an updated intermediate parity as the third data segment is transferred to local memory. A fourth data segment corresponding to a fourth block of data from the first data stripe is transferred from host system memory 20 to local memory 80. The XOR buffer "snoops" the fourth data segment from the RAID subsystem internal bus and substantially simultaneously performs the XOR of the updated intermediate parity and the fourth data segment as the fourth data segment is transferred to local memory.

The resulting parity computation represents the parity of the first set of segments (since a block of data is typically comprised of multiple segments). Subsequently, the DMA controller transfers the buffer contents to local cache memory.

The present invention repeats this process until all data segments within host memory 20 corresponding to blocks within a stripe are transferred to local memory and the parity is computed for the corresponding blocks within the data stripe. The final parity result is transferred to local memory after the parity for corresponding blocks within the stripe is computed. The XOR buffer 72 is reinitialized after computing parity for each set of data segments. Later when the RAID controller is ready to post the data to disk, the disk controller 90 is configured to retrieve data from the local memory 80 and write it to the disk array 100.

Though the above discussed embodiment represents the best presently known mode of practicing the present invention, those skilled in the art will recognize equivalent embodiments of the present invention wherein the first data segment may be handled in other manners. For example, the FIFO 73 is reset to zero values before the transfer of a segment in the first block. Each data segment transferred is then simply XOR'd with the present (accumulating) parity values of the FIFO 73. This allows all data segments in a sequence of blocks to be treated identically with respect to XOR parity generation within the DMA controller 71. Such design choices in circuit and chip design are well known to those skilled in the art. Specific criteria including power dissipation, layout complexity, library component availability, etc. are considered in choosing among such equivalent designs.

If all the data blocks corresponding to the disk stripe are not present in host memory or local memory, a Read-Modify-Write operation is required in response to a write request. In a first embodiment, the data segments corresponding to the incomplete stripe, and remaining in host memory 20 are written to the XOR buffer 72. The data segment not present in the host memory is read from the disk array, transferred to local memory 80, and is written to the XOR buffer 72. The data segments are XOR'd with the previous intermediate parity computations corresponding to the incomplete stripe and the result is the new parity for the stripe which is later stored in local memory 80.

In a second embodiment, only one segment or portion of a segment is not present in the host memory to complete the stripe, and the segment is not available in local memory but old data and old parity that can reconstruct the segment is available in local memory. After transferring the old data and old parity to the XOR buffer 72, the XOR buffer computes the parity of the old data and old parity. The DMA controller 71 reads the remaining data segments from the host system memory 20 and the XOR buffer 72 computes the XOR between the remaining data segments and the previous computed parity result. The resulting parity for the stripe is later stored in local memory 80.

In the preferred embodiment, the disk array bus 91 in the present invention is a SCSI bus. The disk drive interface controller 90 is a SCSI controller and interfaces the RAID controller 40 to the disk array 100. A person skilled in the art will recognize the present invention is operable for disk drives connected using an EIDE bus, Fibre Channel SCSI, Fast SCSI, or Wide SCSI or other well known interface media and protocols which provide for intelligent control by the peripheral devices attached to the RAID controller.

An exemplary RAID level 5 disk array contains 5 disks with a block size on each disk mapped as 4k bytes. Each disk in the array contains a plurality of 4k byte blocks. A parallel stripe in this example contains 16k bytes of data and 4k bytes block of parity. The 16k byte of data is divided into one 4k byte block of data on each of the four disks in the array. The parity resides in a fifth disk. The present invention, however, is operable using any other RAID level disk array, and block size with corresponding stripe size.

Figure 3:
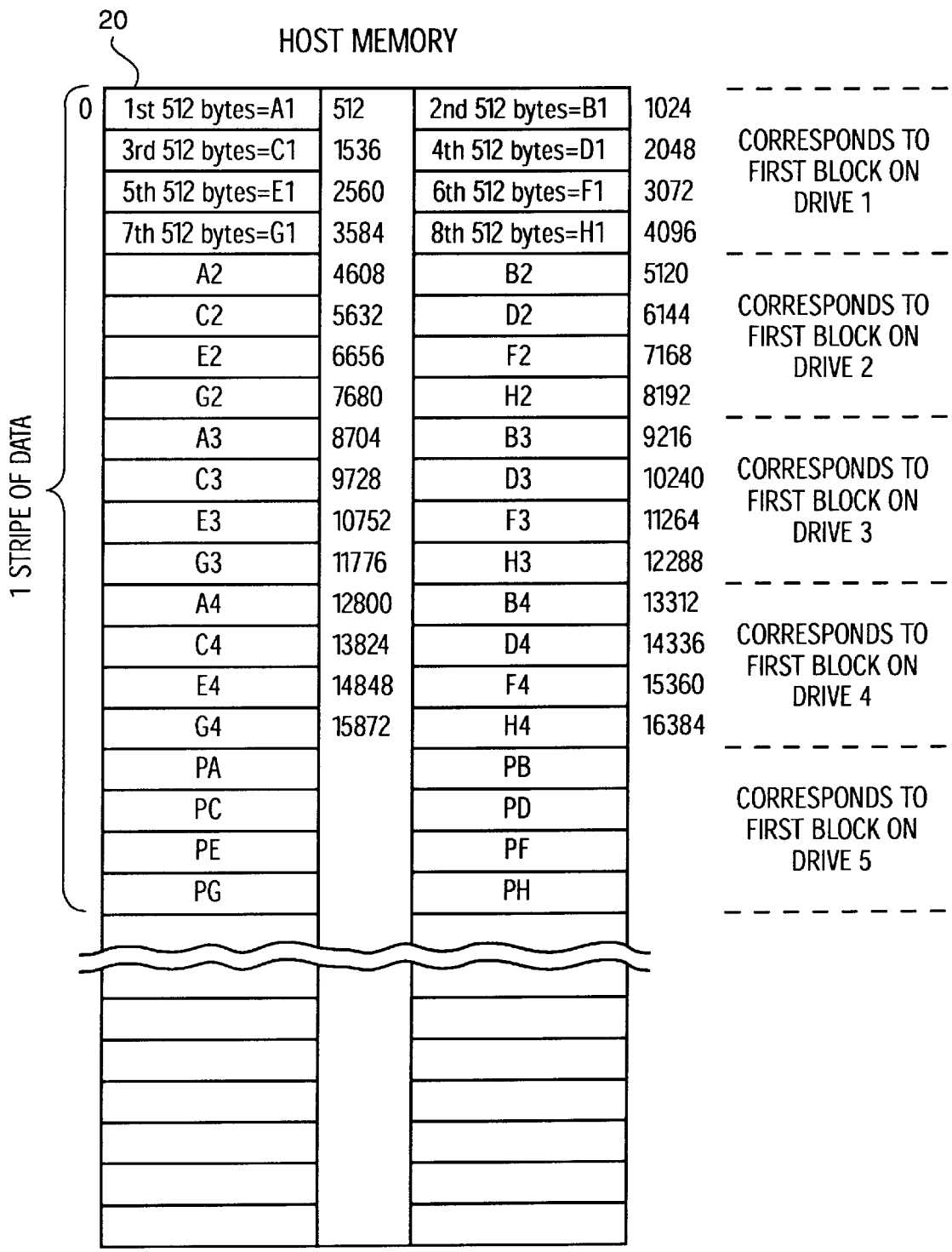
FIG. 3 is a block diagram depicting how the DMA controller accesses and reads data from a memory system.

FIG. 3 is a block diagram depicting how the DMA controller accesses and segments data from an exemplary contiguous host memory system 20. When the host data physically resides as a contiguous block, FIG. 3 depicts the segmentation process that can be implemented in software or hardware as later describe in pseudo code. A person skilled in the art will recognize the segmentation process is also operable to read data from local memory when the data is non-contiguous and is described as a plurality of elements in a scatter/gather list.

In FIG. 3, a file in host memory is segmented into a plurality of 512 bytes segments. If a 16k byte file is stored in the host, this results in 16k bytes of data and 4k byte parity, which in total results in 20k bytes. Bytes 1 to 4096, or A1 to H1, represent the first eight 512 byte segments that correspond to the first 4k byte block that will be stored in disk drive 110. Similarly, bytes 4097 to 8192, or A2 to H2, represent the first eight 512 byte segments that correspond to the first 4k byte block that will be stored in disk drive 120. Bytes 8193 to 12288, or A3 to H3, represent the first eight 512 byte segments that correspond to the first 4k byte block that will be stored in disk drive 130. Bytes 12289 to 16384, or A4 to H4, represent the first eight 512 byte segments that correspond to the first 4k byte block that will be stored in disk drive 140. Bytes PA to PH represent the first 4k byte block that will be stored in disk drive 150 and bytes PA to PH contain parity information.

Segment A1 represents the first 512 byte segment of the first block of data in drive 110. Similarly segments A2, A3, and A4 represents the first 512 byte segment of the first block of data in drive 120, 130 and 140 respectively. The XOR, or parity of A1, A2, A3, and A4 represents PA (i.e. PA is the XOR of the first 512 byte segments from the first stripe within host memory). Segments B1 to B4 represents the second 512 byte segments of the first block of data in drive 120, 130 and 140 respectively. The parity of B1, B2, B3, and B4 represents PB. To perform the necessary parity computation PA to PH, the DMA is programmed to read and group the appropriate noncontiguous 512 byte segments from areas in host memory 20, which are separated by 4k bytes.

For example, the DMA reads and transfers the non-contiguous segments A1, A2, A3, and A4 sequentially. A person skilled in the art will recognize the amount of separation between segments depends on the block size, which in the present invention is 4k bytes, and that this invention is operable for block sizes larger or smaller than 4k bytes. Thus, in response to a write request, the DMA controller 71 outputs the grouped non-contiguous starting and ending addresses of all the data segments corresponding to a stripe of data, and bus control signals so that the destination can access the data directly without the intervention of the CPU.

For exemplary purposes, as 512 byte segment of data from host memory, segment A1, is transferred to local memory 80, the XOR buffer 72 within the DMA controller 71 "snoops" A1 from internal bus 51. A2 is separated by 4k bytes from A1 and is the next 512 bytes of data "snooped" by XOR buffer 72 on internal bus 51 as A2 is transferred from host memory 20 to local memory 80. As A2 is transferred, the bitwise XOR circuitry 74 within the XOR buffer 72 simultaneously computes the XOR, that is parity of data segments A1 and A2. The resulting intermediate parity value is stored within the XOR buffer 72. As the DMA controller 71 transfers the next 512 bytes of data, A3, the XOR buffer "snoops" A3 from internal bus 51 and XOR circuitry 74 within XOR buffer 72 simultaneously computes the parity of the previously stored parity and data segment A3. The resulting parity overwrites the previously stored parity in the XOR buffer 72. This process is repeated until the parity segment, PA, is computed. PA is the XOR of A1 and A2 and A3 and A4. After PA is computed, the DMA controller 71 transfers PA to local memory 80.

Using the corresponding data segments, this process is repeated to obtain the parity of the B segments, PB, the C segments, PC, the D segments, PD, the E segments, PE, the F segments, PF, the G segments, PG, and the H segments, PH. The resulting parity computations PB, PC, PD, PE, PF, PG, and PH are transferred by the DMA controller 71 to local memory 80. After data and parity are stored in local memory 80, the disk drive interface 90 may be configured to transfer the data from local memory to disk array 100.

The present invention uses the following addressing scheme to determine the address to access each data segment. This addressing scheme assists the DMA in transferring and placing in suitable order the data segments for the XOR parity computations. This addressing scheme may be expressed in pseudo code as:

```
for (stripe=0; stripe<stripe_total;stripe=stripe+1)
  for (cur_seg=0;cur_seg<num_seg; cur_seg=cur_seg+1)
    for (cur_block=0; cur_block<Ndata; cur_block=cur_block+1)
    for (xfer=0; xfer<seg_size; xfer=xfer+1)
      host_addr=host_start+stripe * (block_size *ndata)
                                   +cur_block*block_size
                                   +cur_seg*seg_size
                                   +xfer;
    dest_addr=host_addr-host_start+dest_start;
    {Move data host_addr to dest_addr and compute parity during
      transfer};
    next
  next
 next
next
``` where the associated registers represent:

seg_size: The number of bytes comprising each segment, which is nominally the same size as the XOR buffer;

block_size: The number of bytes written to each disk drive;

ndata: The number of data drives;

transfer size: Total number of bytes to be transferred;

num_seg: The number of segments comprising a block (block size/segment size);

cur_block: Present block being accessed;

cur_seg: Current segment;

transfer counter: Present number of bytes transferred;

stripe_total: Number of stripes to be transferred (transfer size/block size*ndata);

cur_stripe: Current stripe.

The segmentation process may also be used for non-contiguous host data, as described by a scatter/gather list. In this case, the transfer address, that is the address to transfer the data segment is expressed as:

transfer address=(current segment * segment size)+ (current block * block size)+(current stripe *stripe size)+portion of current segment transferred.

The transfer address is compared against the 'floor' and 'ceiling' of the current scatter/gather element where:

floor=sum of the sizes of all previous scatter/gather elements.

ceiling=floor+size of current scatter/gather elements.

If the transfer address lies within the current scatter/gather element, the floor is subtracted from the transfer count (as previously defined) and the result is added to the base physical address of the current scatter/gather element, that is, the current segment. If the transfer address is greater than the ceiling of the current scatter/gather element, the segmentation process advances to the next scatter/gather element and the transfer address is compared against the floor and ceiling of the current scatter/gather element. If the transfer address is less than the floor of the current scatter/gather element, the segmentation process returns to the previous scatter/gather element and the transfer address is compared against the floor and the ceiling of the current scatter/gather element.

When a disk failure occurs and a drive is not operating, that is the disk array is operating in degraded mode, the present invention is operable to reconstruct data from the failed drive. In a first embodiment, after responding to a read or write request, the disk interface controller 90 transfers data from the operating disk drives in the disk array 100 into local memory 80. The XOR buffer 72 is reset to all zeros and the address range is set by writing control registers with addresses that correspond to the host system address (which is the destination for the data), or an internal address which is later translated to the host address. The DMA controller 71 transfers the data in 512 byte segments from local memory to the host 20. As the data is transferred, the XOR buffer 72 "snoops" the data segments on the internal bus 51 corresponding to the appropriate stripe the lost data was located on. Each data transfer has a destination address in host memory, which corresponds to a portion of the addressing as represented in FIG. 3. The XOR buffer 72 simultaneously computes an intermediate parity of the data segments as each data segment is sent to the host memory 20. After all the appropriate data segments corresponding to the stripe are transferred to the host memory 20, the DMA controller 71 transfers the parity corresponding to the stripe from local memory and the XOR buffer simultaneously computes the XOR of the intermediate parity and the parity corresponding to the stripe. The result is the reconstructed data and the DMA controller 71 transfers the reconstructed data to the host system memory 20. The reconstructed data may be transferred 'real time' to the host system as parity s transferred to the XOR buffer, or the contents of the XOR buffer may be transferred to local memory 80 to support later transfer to a newly installed or hot spare disk. For non-buffered applications, such as video streaming, a larger XOR buffer may be desirable for the simultaneous generation of data of the non-functioning drive and transfer of data to the host.

In the second embodiment, after responding to a read or write request, the disk interface controller 90 transfers data from the operating disk drives in the disk array 100 into the host system memory 20. The XOR buffer 72 is reset to all zeros and the XOR address range is set by writing the control registers with an address corresponding to the host system address (the destination of the data), or an internal address which is later translated to the host address. The CPU instructs the disk drive controller 90 to transfer a first set of data from operation drives 100 to the host system memory 20, each transfer being less than or equal to the XOR buffer 72 size. As the data is transferred, the XOR buffer 72 "snoops" the data segments on the internal bus 51 and simultaneously computes an intermediate parity of the data segments as each data segment is sent to the host memory 20. Each data transfer has a destination address in host memory 20 which corresponds to a portion of the addressing as represented in FIG. 3. After all the appropriate data segments corresponding to the stripe are transferred to the host memory 20, the CPU instructs the disk drive controller 90 to transfer the parity corresponding to the stripe to the internal XOR address. The XOR buffer 72 simultaneously computes the XOR of the intermediate parity and the parity corresponding to the stripe. The result is the reconstructed data and the DMA controller 71 transfers the reconstructed data to the host system memory 20.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a DMA controller of a RAID storage controller in a RAID storage subsystem, a method to compute parity comprising the steps of:

transferring a data portion of a stripe from a host system to a RAID storage subsystem through said DMA controller from a random access source memory to a destination memory, wherein said data portion of said stripe is comprised of a plurality of data blocks wherein each of said plurality of data blocks is comprised of a plurality of data segments, and wherein said plurality of data segments are stored in said source memory in a first predetermined order and wherein said data segments are transferred to said destination memory in a second predetermined order different from said first predetermined order; and computing, within said DMA controller, a plurality of XOR parity segments corresponding to said plurality of data segments, wherein the step of transferring a data portion of a stripe further comprises the steps of:

a) transferring a first data segment of said plurality of data segments of a data block of said plurality of data blocks of said stripe;

b) transferring a corresponding data segment of said plurality of data segments of a next data block of said plurality of data blocks;

c) storing XOR parity generated by said computing step in a buffer;

d) repeating steps b) and c) for each data block of said stripe until each corresponding data segment of each block of said plurality of data blocks of said stripe have been transferred; and e) repeating steps a) through d) for a next data segment of said plurality of data segments in each of said plurality of blocks in said data portion of said stripe until all of said plurality of data segments have been transferred, and wherein the computing step is performed substantially simultaneously with said step of transferring.

2. The method of claim 1 further comprising the step of:

storing each of said plurality of XOR parity segments in said destination memory.

3. The method of claim 1 wherein said buffer is a FIFO for XOR parity accumulation and wherein the step of transferring said plurality of data segments further comprises the steps of:

a) resetting said FIFO to all zeros;

b) transferring a data segment of said plurality of data segments of a data block of said plurality of data blocks;

c) storing XOR parity generated by said computing step in said FIFO;

d) repeating steps b) and c) for each data block of said plurality of data blocks of said stripe until each corresponding data segment of each data block of said plurality of data blocks of said stripe have been transferred;

e) repeating steps a) through d) for a next data segment of said plurality of data segments in each of said plurality of blocks in said data portion of said stripe until all of said plurality of data segments have been transferred.

4. The method of claim 1 wherein said buffer is a FIFO for XOR parity accumulation and wherein approximately equal in size to the size of one of said plurality of data segments and wherein said step of transferring a plurality of data segments includes the step of:

reading said data segments from said source memory in a predetermined order operable to compute XOR parity of corresponding segments of said data portion of said stripe substantially in parallel with the transfer of said plurality of data segments.

5. The method of claim 1 further comprising a storage subsystem including a plurality of disk drives and is operating in a degraded mode having at least one non-functional disk drive with corresponding missing data segments from said plurality of data segments, and wherein the step of transferring includes the steps of:
transferring said plurality of data segments, wherein said transfer is devoid of said missing data segments; and
transferring previously computed associated parity segments, and
wherein the step of computing a plurality of XOR parity segments comprises the step of:
computing a plurality of XOR parity segments representative of said missing data segments.

6. A DMA controller for computing XOR parity in a RAID storage subsystem comprising:

DMA transfer means for transferring a data portion of a stripe from a random access source memory to a destination memory in a predetermined order different than the order in which said stripe is stored in said source memory;

a FIFO for storing parity values generated in said DMA controller;

XOR generation means coupled to said FIFO; and

XOR buffer circuit coupled to said DMA transfer means for capturing said stripe as it is transferred by said DMA transfer means wherein said circuit is operable to control said FIFO and said XOR generation means in response to transfer of said stripe by said DMA transfer means, wherein said stripe is comprised of a plurality of blocks and wherein each block is comprised of a plurality of segments, and wherein said DMA transfer means further comprises:
means for transferring a first data segment of said plurality of data segments of a data block of said plurality of data blocks of said stripe;
means for transferring a corresponding data segment of said plurality of data segments of a next data block of said plurality of data blocks;
means for storing XOR parity generated by said XOR buffer circuit;
first means for repeating operation of said means for transferring a corresponding data segment and operation of said means for storing for each data block of said stripe until each corresponding data segment of each block of said plurality of data blocks of said stripe have been transferred; and
first means for repeating operation of said means for transferring a first data segment and operation of said means for transferring a corresponding data segment and operation of said means for storing and operation of said means for repeating for a next data segment of said plurality of data segments in each of said plurality of blocks in said data portion of said stripe until all of said plurality of data segments have been transferred.

7. The DMA controller of claim 6 wherein said XOR buffer circuit includes:

first means for controlling said memory to store data captured during transfer of said plurality of data segments in said memory;

second means for controlling said memory and said XOR generation means to compute the bitwise XOR of data previously stored in said memory and data captured during transfer of said plurality of data segments and to store said bitwise XOR result in said memory; and third means for controlling said memory to read the contents of said memory for purposes of transferring parity data from said memory to said destination memory.

8. A DMA controller for use in a RAID storage controller of a RAID storage subsystem, said DMA controller comprising:

means for transferring a data portion of a stripe through said DMA controller from a random access source memory to a destination memory, wherein said stripe is stored in a predetermined first order in said source memory and wherein said stripe is transferred to said destination memory in a predetermined second order different from said predetermined first order; and means for computing, within said DMA controller, a plurality of XOR parity segments corresponding to said stripe, wherein said means for computing and said means for transferring are operable substantially simultaneously, wherein said stripe is comprised of a plurality of blocks and wherein each block is comprised of a plurality of segments, and wherein said means for transferring further comprises:
means for transferring a first data segment of said plurality of data segments of a data block of said plurality of data blocks of said stripe;
means for transferring a corresponding data segment of said plurality of data segments of a next data block of said plurality of data blocks;
buffer means for storing XOR parity generated by said means for computing;
first means for repeating operation of said means for transferring a corresponding data segment and operation of said means for storing for each data block of said stripe until each corresponding data segment of each block of said plurality of data blocks of said stripe have been transferred; and
first means for repeating operation of said means for transferring a first data segment and operation of said means for transferring a corresponding data segment and operation of said means for storing and operation of said means for repeating for a next data segment of said plurality of data segments in each of said plurality of blocks in said data portion of said stripe until all of said plurality of data segments have been transferred.

9. The DMA controller of claim 8 further comprising:
means for storing each of said plurality of XOR parity segments in said destination memory.

10. The DMA controller of claim 9 wherein said buffer means includes a FIFO for XOR parity accumulation, said FIFO being approximately equal in size to the size of one of said plurality of data segments.

11. The DMA controller of claim 8 further comprising a storage subsystem including a plurality of disk drives and is operating in a degraded mode having at least one non-functional disk drive with corresponding missing data segments from said plurality of data segments, and wherein said means for transferring includes:
  means for transferring said plurality of data segments, wherein said means for transfer is devoid of said missing data segments; and
  means for transferring previously computed associated parity segments, and
  wherein said means for computing a plurality of XOR parity segments includes:
    means for computing a plurality of XOR parity segments representative of said missing data segments.

12. A system within a RAID storage system controller for performing transfer of a RAID stripe substantially simultaneous with computation of error detection and correction information, said system comprising:

a DMA transfer controller for transferring said RAID stripe stored in a first predetermined order a random access source memory to a destination memory in a second predetermined order; and an error detection and correction computation element coupled to said DMA transfer controller for computing said error detection and correction information substantially simultaneously with the transfer of said RAID stripe by said DMA transfer controller, wherein said RAID stripe is comprised of a plurality of data blocks wherein each of said plurality of data blocks is comprised of a plurality of data segments, and wherein said DMA transfer controller is controllably operable to:
  a) transfer a first data segment of said plurality of data segments of a data block of said plurality of data blocks of said stripe;
  b) transfer a corresponding data segment of said plurality of data segments of a next data block of said plurality of data blocks;
  c) store XOR parity generated by said computing step in a buffer;
  d) repeat steps b) and c) for each data block of said stripe until each corresponding data segment of each block of said plurality of data blocks of said stripe have been transferred; and
  e) repeat steps a) through d) for a next data segment of said plurality of data segments in each of said plurality of blocks in said data portion of said stripe until all of said plurality of data segments have been transferred.

13. The system of claim 12 wherein said error detection and correction computation element is operable in a plurality of modes and includes:

at least one programmable address range register to controllably select an operating mode from said plurality of modes.

14. The system of claim 13 wherein said buffer includes:

a FIFO buffer and where said error detection and correction computation element is controllably operable in a mode wherein data transferred by said DMA transfer controller is stored in said FIFO buffer for purposes of initializing said error detection and correction information.

15. The system of claim 13 wherein said buffer includes:

a FIFO buffer and where said error detection and correction computation element is controllably operable in a mode wherein data transferred by said DMA transfer controller is XOR'd with corresponding error detection and correction information presently stored in said FIFO buffer for purposes of updating said error detection and correction information.

16. The system of claim 13 wherein said buffer includes:

a FIFO buffer and where said error detection and correction computation element is controllably operable in a mode wherein said source memory comprises said FIFO buffer and wherein said data transferred by said DMA transfer controller comprises said error detection and correction information in said FIFO buffer and wherein said error detection and correction information is transferred by said DMA transfer controller to said destination memory.

* * * * *